Figure 1:
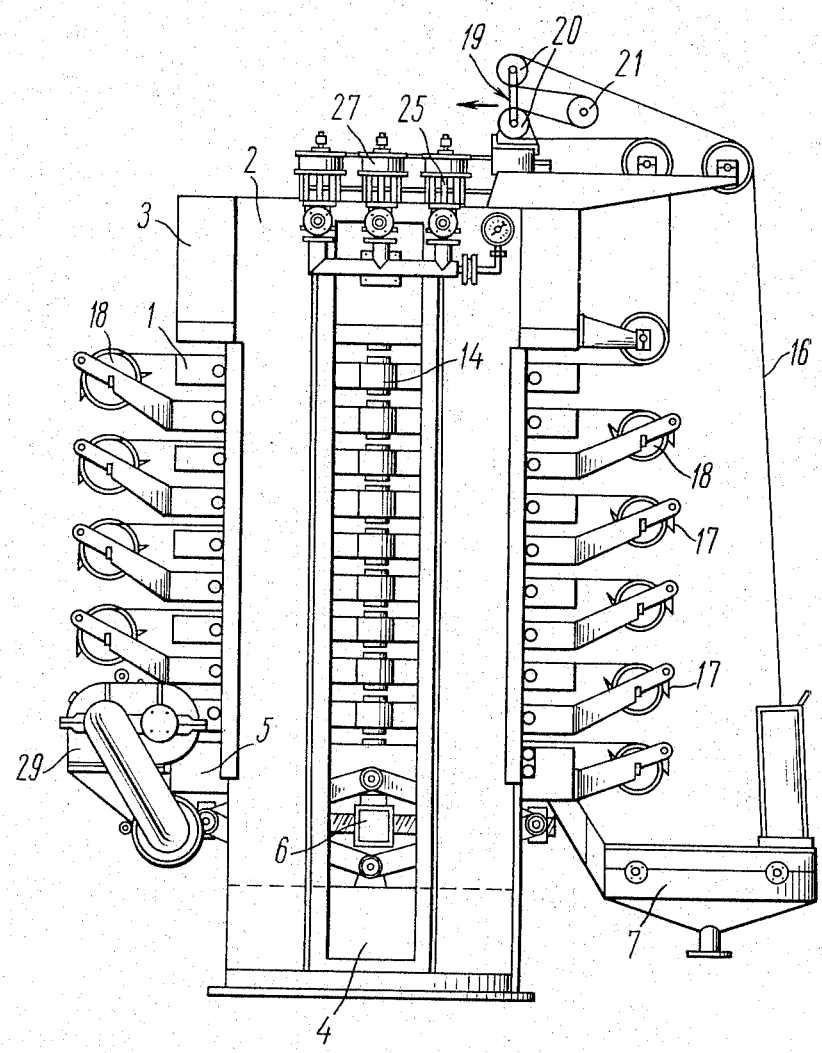

Sept. 19, 1967   I. S. ERMAKOV ETAL   3,342,123
AUTOMATIC CHAMBER PRESSURE FILTER
Filed April 15, 1964   2 Sheets-Sheet 1

Sept. 19, 1967   I. S. ERMAKOV ETAL   3,342,123
AUTOMATIC CHAMBER PRESSURE FILTER
Filed April 15, 1964   2 Sheets-Sheet 2

United States Patent Office 3,342,123
Patented Sept. 19, 1967

3,342,123
AUTOMATIC CHAMBER PRESSURE FILTER
Ivan Semenovich Ermakov, Georgy Mikhailovich Kochkin, Mikhail Jakovlevich Meshengisser, and Filipp Nikolaevich Shakhov, Kharjkov, U.S.S.R., assignors to Ukrainsky Nauchno-Issledovatelsky Institute Khimicheskogo Mashinostroenija, Kharjkov, U.S.S.R.
Filed Apr. 15, 1964, Ser. No. 360,015
2 Claims. (Cl. 100—115)

This invention relates to apparatus used to implement automatically the processes of filtration, washing and pressing out the residue of suspensions which are difficult to filter.

The known designs of the atomatic pressure filters have a number of disadvantages.

For example, according to U.S.S.R. author's certificate No. 100,150 a new design for a pressure filter has been developed which has certain advantages compared with the existing designs of pressure filters. To the mentioned advantages belong:

possibility of filtering in the optimum layer of the residue;
horizontal arrangement of filter plates creating good conditions for the residue to be washed uniformly;
comparatively short period of time required for intermediate operations (1.5–2 min.), and
effective regeneration of the filter cloth.

However, the aforementioned type of pressure filter has a number of disadvantages such as:

application of sealing rubber hoses does not permit the filtration pressure to exceed 5 atm.;
a considerable amount of compressed air is required to dry the filter cake and especially a cracking one;
with the stationary arrangement of filter plates a sudden change in the suspension concentration may cause residue collection in the interplate space.

Various attempts have been made to improve the design of pressure filters. One of them, in particular, considered the application of hollow diaphragms resembling very much a bag with a pipe connection whereinto liquid is supplied to form filter chambers and press out the residue (consult author's certificate No. 120,502 dated October 24, 1958, U.S.S.R.).

However, said diaphragms turned out to be unreliable because of their rather complicated shape, and therefore did not find significant application in industry.

We propose a new design for an automatic chamber pressure filter with a mechanical plate clamping, wherein the horizontally arranged and arbitrarily interpositioned filter plates move and become compressed by the pressure plate and clamping device, the latter being preferably of the electromechanical-action type.

This particular condition makes it possible to avoid the application of rubber-cloth sealing hoses for forming filter chambers and permits the filtration to proceed at a pressure of up to 30 atm. To prevent residue collection in the interplate space, the frames forming the filter chambers should be manufactured 5–10 mm. smaller as compared with the interplate space in the case of the open pressure filter.

To avoid the use of compressed air for pressing out residues, mainly compressible and cracked ones, a filter plate has been proposed which consists of two parts: the upper part provided with a drain screen and serving as a filtrate diversion chamber and the lower one made as a frame which forms filter chambers as a result of plate compression.

With the proposed design of the filter plate the pressing out of both suspension and the residue is obtained by means of a diaphragm, manufactured in the shape of a flat rubber sheet, which is simple in design and reliable in operation.

To realize said design diagram for a filter having a filter cloth stretched zigzag-wise between the filter plates and passing through the regeneration chamber, we propose a preferred embodiment of the invention wherein the filter plates, the rollers with the cloth stretched thereon and the regeneration chamber move simultaneously with the opening and closing of the pressure filter. In this case the cloth tension slide moves forward upon the closure of the pressure filter and conversely moves rearward as the filter opens.

It is an object of this invention to provide a design for an automatic pressure filter performing the processes of filtration, washing and drying of the residue under optimum conditions and with the least electric energy consumption.

It is a further object of this invention to obtain the highest-possible reduction in the filter cake moisture content without using compressed air to dry it, while obtaining a pure filtrate.

It is still a further object on this invention that not only the time required for residue discharge be very greatly reduced but a much more effective cloth regeneration be obtained.

Other objects of this invention are to insure an ample filtrating surface and a relatively small weight per unit of the ready product.

Figure 2:
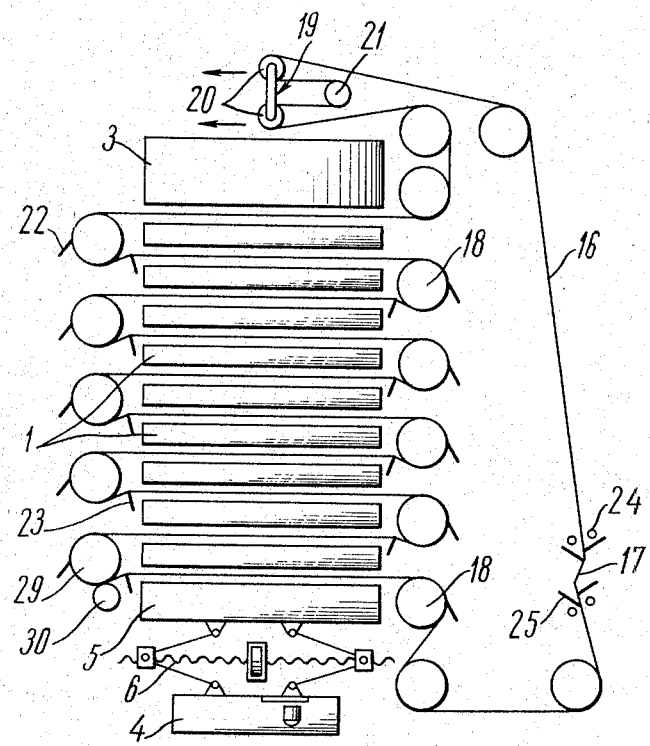
Figure 3:
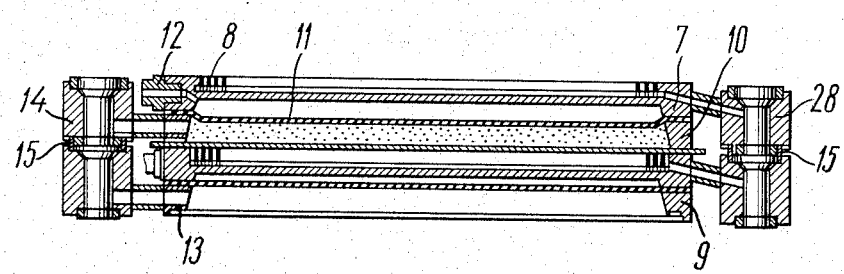

These and other objects and advantages of the invention will be understood from the following detailed description of the proposed suggested pressure-filter as illustrated in the accompanying drawings in which:

FIG. 1 is a general view of the automatic chamber pressure filter with a mechanical plate clamp;
FIG. 2 is a diagram of cloth arrangement in the pressure filter with horizontally placed and vertically displaceable filter plates;
FIG. 3 is a cross-section of filter plates in operative condition.

The proposed pressure filter comprises a set of horizontally placed filter plates 1 moving up and down, relative to each other, at a preferred distance of 45 to 50 mm.

To avoid shifting of filter plates in the course of their movement said plates are placed between guides 2 which are connected to extreme plates 3 and 4 which carry the total filtration pressure.

Movement of the filter plates and their clamping are achieved by means of pressure plate 5 and a jack-like clamping device 6 preferably of the electromechanical type, which provide rapid opening and closing of the pressure filter (20 sec. for opening and 20 sec. for closing), and sealing of the filter chambers with simultaneous shifting of the total load, caused by filtration pressure, onto extreme plates 3 and 4.

The filter plates consist of two parts: the upper one 7 provided with a drain screen 8 and serving as a filtrate diversion chamber and the lower part 9 made as a frame which forms filter chambers as the filter plates are compressed. To prevent residue collection in the interplate space the height of manufactured frames is 5 to 10 mm. less than the clearance between the filter plates in case of the open pressure filter.

To avoid bending of the frames, usually caused by filtration pressure, the outer surface of the frames rests upon racks 10 which are welded to the upper part of the filter plate.

Plain elastic and waterproof diaphragms 11 are placed between the upper and lower parts of the filter plates secured by four bolts and pins so that the plates are still capable of moving 3 to 4 mm. relative to each other.

The water under a pressure of up to 30 atm. having passed through pipe connection 12 located in the upper part of the filter plate is delivered to the diaphragm for pressing out the suspensions and residues.

A rubber cord 13 is provided in the lower part of the frame to seal the chambers as the filter plates become compressed.

Both the suspension supply chamber and that of filtrate diversion communicate by means of channels with special pipes 14 and 28 wherein rubber gaskets 15 are placed. Owing to this pressurized chambers are formed and when the filter plates become compressed the chambers serve for supplying suspension and diverting both filtrate and wash water.

The realization of the said pressure filter design with a zigzag endless filter band 16 stretched between the plates and passing through regeneration chamber 17 is achieved by moving rollers 18 and regeneration chamber 17 simultaneously with the corresponding filter plates. In this case, tension slide 19 moves forward and the pressure filter closes and conversely moves rearward if the latter opens.

To compensate the cloth extension in the process of the filter operation, tension slide 19 serves as a pulley block comprising three rollers of which the upper and the lower ones 20 are interconnected and synchronously move forward and rearward, whereas middle roller 21 is fixed. Such arrangement of rollers gives an opportunity to extend the cloth four times longer than the length of the tension slide travel.

As the filter cake becomes compactly pressed by the diaphragm it may easily be separated from the cloth as soon as the cloth with residue reaches the highly cambered roller. However, to insure complete removal of residue, special "floating"-type knives 22 on flat springs are provided at each roller. Similar knives 23 are also found on the cloth lower run, which serve to remove residue from the cloth.

To provide effective cloth regeneration the regeneration chamber is fitted with perforated pipes having revolving brushes 24 through which water is delivered under pressure, and knives 25 intended for cleaning the cloth of dirt.

The proposed pressure filter may be actuated when driven either by an electrohydraulic or some other kind of automatic device.

The said pressure filter operates as follows: when starting the pressure filter, the electric motor of the clamping device (not shown) is switched on; the clamping device closes the pressure filter and compresses the filter plates thus forming the filter chambers.

Upon the closure of the pressure filter, the plate clamping relay will send a pulse for opening suspension supply valve 26. Suspension may enter the filter chambers under a pressure of up to 30 atm.

After that the liquid is delivered through pipe connection 12 to water-proof sheet diaphragm compressed to 30 atm. which presses out the amount of suspension remaining in the filter chambers meantime pressing off the filter cakes.

Thus, the process of filtration runs completely in conformity with the two-phase system "fluid-solid" and therefore no cracking of filter cakes occurs.

To wash the residue the water is fed through valve 27 onto the residue chamber, beneath diaphragm 11, the liquid pressure in the diaphragm chamber being removed. Pressing out of the wash water is similar to that of suspension and is accomplished by means of the sheet diaphragm.

Diversion of both filtrate and wash water is obtained through a common collector formed by pipes 28 wherein the filtrate, strong and weak wash waters are separately diverted through a three-valve box (not shown).

After all the operations are over, the clamping device lowers thus opening the pressure filter. The filter plates are fixed in the lower position.

The revolving drive drum 29 with pressure roller 30 installed on the lower plate together with the drive carries out the cloth and the residue from the inter plate space.

In a pressure filter with large operating surface (50 and 100 sq. m.) all the rollers, if required, may have a common drive and a drive drum to facilitate cloth movement.

If a certain amount of the solid phase is allowed to be carried away together with the filtrate then the cloth should move to a length equal to the distance between the rollers.

In such a case the cloth having reached the roller bends with its dirty surface facing downwards and is regenerated by the filtrate in the course of the coming filtration cycle.

To obtain a purified filtrate the cloth is extended to a length equal to the doubled distance between the rollers placed opposite within one and the same horizontal plane.

In this case filtration takes place on one side of the cloth only thus decreasing the quantity of solid phase carried away by filtrate.

To obtain a completely purified filtrate, auxiliary filter cloth or filter packs may be, if necessary, arranged on the filter plate surfaces as in the case of mycerine and sterptomycine filtration.

After passing the last plate, the cloth enters regeneration chamber 17 where it is washed by water or any other liquid delivered under pressure hereinto through perforated pipes and cleaned by knives 25 and soft revolving brushes 24.

The proposed pressure filter has been tested with suspensions of hydrated nickel protoxide, zinc hydroxide, silicomanganese, dyes, kaolin, limnocalcite etc. The efficiency obtained was 8–15 times more than that of frame pressure filters with manual removal of residue. The residue humidity was less by 15 to 20 percent. Service life of the cotton belting is 3 to 4 months and that of capron 5 to 6 months with the pressure filter two-shift operation.

The tests proved our invention to have advantages over the existing filters; said advantages are:

the proposed pressure filter has an ample filtrating surface providing filtration and pressing out of residue under a pressure of 30 atm. even in the optimum layer;
for the majority of suspensions the invention does not require compressed air for pressing out the residue;
it provides effective regeneration of the cloth decreasing meantime the residue humidity;
provides effective washing of residues as the filter plates are placed horizontally and pressing out of residue is achieved not by air but a sheet diaphragm which prevents, filter cake cracking;
a comparatively short period of time is required for intermediate operations (clamping, opening and discharge of pressure filter takes 1 minute all in all);
the process is completely automatic and does not require any manual labour in the course of filter operation;
a comparatively light weight of the pressure filter;
electric energy consumed per unit of the product is 4 to 5 times less as compared with the existing pressure filters.

The pressure filter can be widely used for filtrating various products in chemical, coal mining, ceramical, food, oil, nonferrous metal and other branches of industry being examples. Though the present invention has been described in accordance with the preferred method of practical application it is apparent that various modifications can be made without departing from the spirit and scope of the invention which can be easily understood by those skilled in the art. These modifications are considered to be within the embodiment and scope of the invention and the appended claims.

What we claim is:

1. An automatic chamber pressure filter comprising: guides, horizontally arranged filter plates consisting of upper and lower parts of which the upper part serves as a filtrate diversion chamber whereas the lower part is a frame forming a filtration chamber; a waterproof sheet diaphragm provided between the lower and the upper parts of the plate and adapted to press out suspension and press off filter cake; extreme plates, said filter plates being located between the extreme plates which are adapted for carrying the total filtration load and are interconnected by said guides; a clamping device to compress said filter plates; rollers, a filter cloth on said rollers and disposed zigzag-wise between the said filter plates; springs, two knives on said springs at each of the rollers, one of said knives being adapted for removal of residue and the other for fine cleaning of the cloth; a regeneration chamber for the said filter cloth and a tension slide providing compensation of the filter cloth extension and consisting of three vertically related rollers of which the middle one is fixed whereas the upper and lower ones are interconnected and move synchronously; and means for moving said rollers and regeneration chamber simultaneously with the filter plates.

2. An automatic chamber pressure filter comprising: guides, horizontally arranged filter plates consisting of upper and lower parts of which the upper part serves as a filtrate diversion chamber whereas the lower part is a frame forming a filtration chamber; a water-proof sheet diaphragm provided between the lower and upper parts of the plate and adapted to press out suspension and press off filter cake; extreme plates, said filter plates being located between the extreme plates which are adapted for carrying the total filtration load and are interconnected by means of said guides; a clamping device to compress said filter plates; rollers, a filter cloth on said rollers and disposed zigzag-wise between said filter plates; springs, two knives on said springs at each of the rollers, one of said knives being adapted for removal of residue and the other for fine cleaning of the cloth; a regeneration chamber for the said filter cloth, perforated pipes and revolving brushes in the regeneration chamber adjacent the cloth, knives in said regeneration chamber to clean the cloth of dirt; a tension slide providing compensation of filter cloth extension and consisting of three vertically related rollers of which the middle one is fixed, whereas the upper and lower ones are interconnected and move synchronously; and means for moving said rollers and regeneration chamber simultaneously with the filter plates.

References Cited
UNITED STATES PATENTS

| | | | |
|---|---|---|---|
| 772,472 | 10/1904 | Neill | 100—222 X |
| 1,870,121 | 8/1932 | Jackson | 100—112 X |
| 3,098,429 | 7/1963 | Hagglund | 100—115 |

FOREIGN PATENTS 120,502   10/1958   U.S.S.R.

LOUIS O. MAASSEL, *Primary Examiner.*